United States Patent [19]

Yoshiura et al.

[11] Patent Number: 5,243,689
[45] Date of Patent: Sep. 7, 1993

[54] CASE-BASED INFERENCE PROCESSING METHOD

[75] Inventors: Hiroshi Yoshiura; Fumihiko Mori, both of Yokohama, Japan

[73] Assignee: Hitachi, Ltd., Tokyo, Japan

[21] Appl. No.: 713,761

[22] Filed: Jun. 11, 1991

[30] Foreign Application Priority Data

Jun. 15, 1990 [JP] Japan .................................. 2-157188

[51] Int. Cl.5 ............................................. G06F 15/20
[52] U.S. Cl. ..................................... 395/51; 395/919; 395/77
[58] Field of Search ............................. 395/51, 76, 919

[56] References Cited

PUBLICATIONS

Hinkle, D., "Clavier Advisor": A Case Based Autoclave Loading Lockheed Artificial Intelligence Center, Mar. 1990.
Koton, P., "Using a Case Memory to Integrate Case-Based and Causal Reasoning", Case-Based Reasoning Workshop, Aug. 1988, 74–81.
Maher, M. L., "Process Models for Design Synthesis", AI Magazine, Winter 1990, pp. 49–58.
Chandrasekaran, B., "Design Problem Solving: A Task Analysis", AI Magazine, Winter 1990, 59–71.
Janet L. Kolodner, "Extending Problem Solver Capabilities Through Case-Based Inference", Case-Based Problem Solving, Proc. 4th Annual Int'l Machine Learning Workshop, 1987, pp. 21–30.
"Operation Manual, Function", for a Hitachi Japanese word processor WordPal 620 HD, 1988, pp. 14–18. (English translation unavailable).
D. H. Ballard, et al., Computer Vision, Chapter 11 "Matching", Prentice-Hall, 1982, pp. 352–382.

Primary Examiner—Michael R. Fleming
Assistant Examiner—Robert W. Downs
Attorney, Agent, or Firm—Fay, Sharpe, Beall, Fagan, Minnich & McKee

[57] ABSTRACT

In a computer system having a storage unit for storing at least one of a program and knowledge used for solving a problem, an input/output unit for inputting a problem to be presently solved, and an execution unit for obtaining a proposed solution of one of the problem to be presently solved and a partial problem of the problem, by using at least one of the program and knowledge in the storage unit, an inference processing method includes the steps of storing a modification case generated upon modification of a solution, calculating a portion, unable to be solved by the proposed solution obtained by the execution unit, of one of the problem to be solved and the partial problem, searching for a modification case containing a problem similar to the unsolved portion, from the modification cases generated upon modification of solutions to problems, correlating the searched modification case with the proposed solution obtained by the execution unit, and modifying the proposed solution obtained by the execution unit in accordance with the correlation and using the modified result as one of an overall solution and an intermediate solution of the problem to be solved presently.

18 Claims, 8 Drawing Sheets

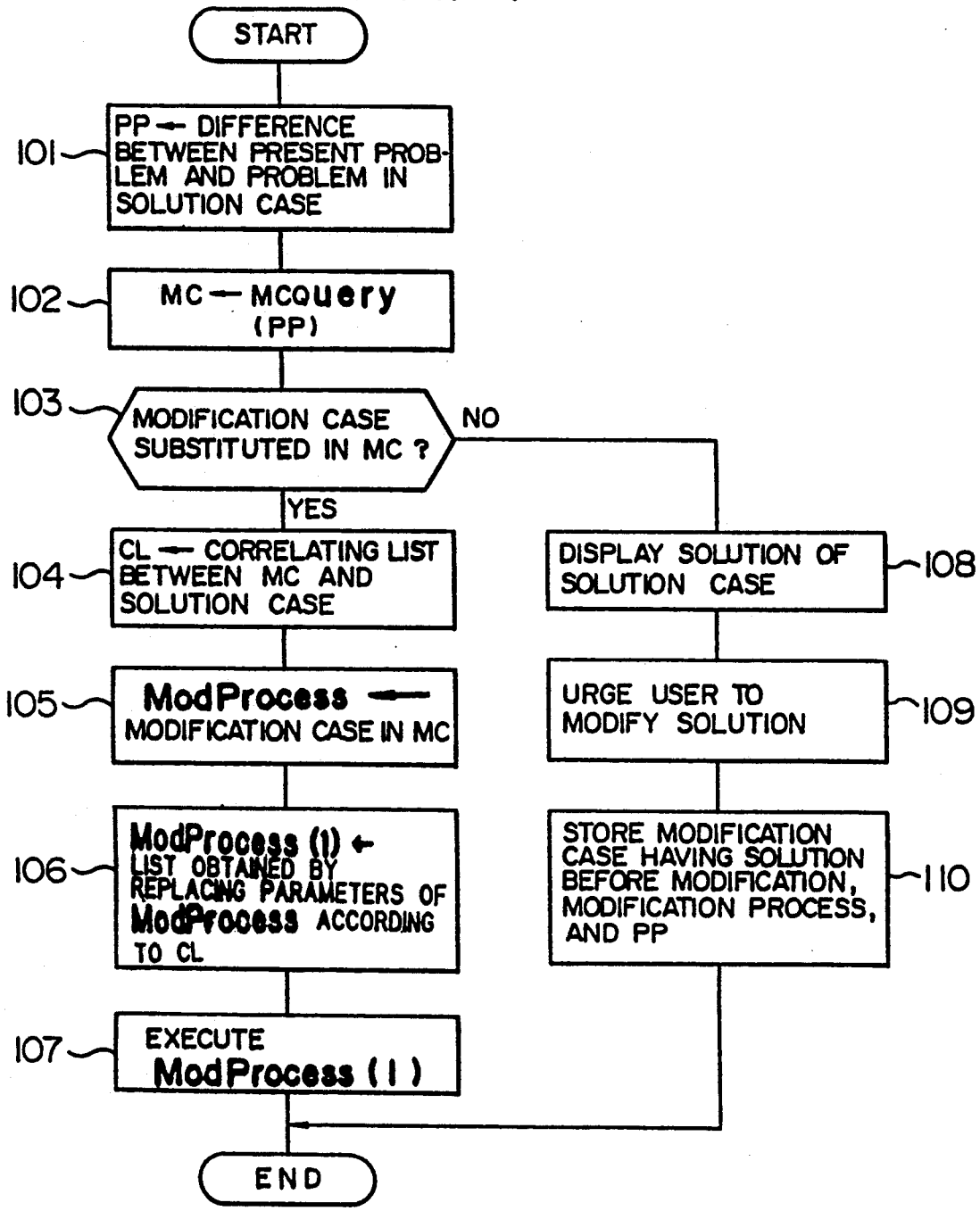
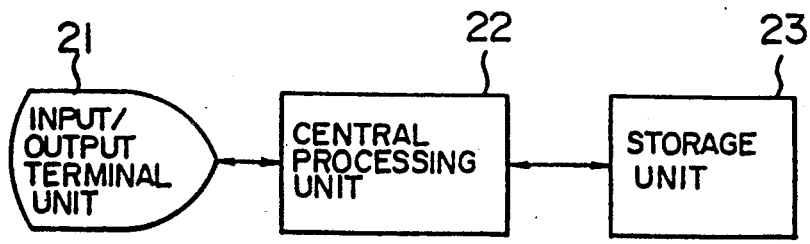

CASE-BASED INFERENCE PROCESSING METHOD

BACKGROUND OF THE INVENTION

The present invention relates to an inference processing method for solving a problem based on previous cases. More particularly, the present invention relates to an inference processing method whereby not only cases indicating how to solve problems, but also other cases indicating how the cases were used, are used, and if a user modifies a solution, this modification case is learnt to automatically modify a similar solution case which might occur in the future.

Recently, an inference system (expert system) for dealing with expert works has been widely used in practice. Expert knowledge is inputted in an expert system generally in the form of rules.

It is however not easy to transform human intuitive knowledge into rules. It is also difficult to describe a number of rules without any contradiction among them. Accordingly, inputting expert knowledge becomes the most serious obstacle when developing an expert system.

Another inference method (case-based inference) has been studied which uses problem solving cases of experts, i.e., past problems and their expert solutions or ways to solve them. It was thought at the initial stage that if an expert system is developed using case-based inference, most of expert knowledge can be inputted in the form of cases, alleviating the difficulty of inputted rules.

However, there exist only a small number of cases which are quite the same as that of a problem now intended to be solved by using case-based inference. Therefore, it becomes necessary to modify the past solution of a case problem or the past way to solve a case problem so as to apply it to a present problem. For modifying a case, it is necessary to provide an inference system with knowledge used by experts to solve problems based on cases. However, with conventional case-based inference, case modification knowledge has been entered in the form of rules, as discussed in the papers on "Case-Based Reasoning Workshop (1988)", pp. 21 to 30.

In general computer systems including such inference systems, programs and knowledge in each system are required to be modified if the system function becomes insufficient for a user need. Such system modification requires much labor and may be likely to contain new errors.

A learning function has been considered as described in the "Operation Manual, Function" of a Hitachi Japanese word processor WordPal 620 HD, (1988), pp. 14 to 18. According to this function, the system selects one of a plurality of solutions (e.g., kanji candidates in kana-kanji transformation). If a user selects another solution, the system learns the selection the user selected, and selects it in the succeeding operation.

SUMMARY OF THE INVENTION

According to the above-described prior art case-based inference method, knowledge is required to be inputted in the form of rules so as to modify a case. Therefore, there arises a difficulty of inputting knowledge, similar to the case of an inference method not using cases but directly inputting expert knowledge.

According to the conventional learning method, only a selection of a solution among previously prepared solutions is learnt, not allowing learning a new solution or a new way to solve. Therefore, a user need cannot be reflected sufficiently.

It is therefore an object of the present invention to solve such problems and provide an inference processing method capable of easily inputting case modification knowledge and if a user modifies a solution made by the system, learning such a modification as a new modification case and automatically modifying a solution similar to the modified solution.

In order to achieve the above object of the present invention, in an inference system having a solution case data base for storing one or more solution cases each including a problem and its solution or a way to solve, an input/output unit for inputting a problem to be solved presently, a solution case retrieving unit for searching from the solution case data base a solution case having a problem similar to the problem to be solved presently or its partial problem, and a solution case modifying unit for modifying a solution or a way to solve of the searched solution case so as to match the problem to be solved presently or its partial problem, and obtaining a solution or an intermediate solution of the problem to be presently solved, the inference system is provided with a modification case data base for storing one or more modification cases a system user modified the solutions, and an inference processing method comprises the steps of searching a modification case having a partial problem similar to the partial problem corresponding to a difference between the problem to be solved or the partial problem, and the problem contained in the searched solution case, from the modification cases stored in the modification case data base, and correlating the searched modification case with the searched solution case.

According to another aspect of the present invention, in a computer system having a program unit for storing a program or knowledge used for solving a problem, an input/output unit for inputting a problem to be presently solved, and an execution unit for obtaining a solution of the problem to be presently solved or its partial problem, by using the program or knowledge in the program unit, the computer system is provided with a modification case data base for storing one or more modification cases a system user modified the solutions (each modification case including a solution before modification, a modification process for the solution or a solution after modification, and a partial problem solved by the modification), and an inference processing method comprises a step of displaying a solution obtained by the execution unit via the input/output unit, a learning step of, if the solution of the displayed solution case is externally modified, learning and storing the modification case as modified, an unsettled portion determining step of calculating or designating a portion, unable to be settled by the solution obtained by the execution unit, of the problem to be solved or the partial problem, a search step of searching a modification case containing a problem similar to the unsettled portion, from the modification cases stored in the modification case data base, a step of correlating the searched modification case with the solution obtained by the execution unit, and a step of modifying the solution obtained by the execution unit in accordance with the correlation and using the modified result as a solution or an intermediate solution of the problem to be solved presently.

According to the present invention, when the solution case modifying unit of the inference system modifies a solution of a solution case, at the modification case retrieving step, there is searched a modification case having a partial problem similar to the partial problem corresponding to a difference between the problem to be solved or the partial problem, and the problem contained in the searched solution case, from the modification cases stored in the modification case data base, the modification process in the searched modification case is applied to the solution of the searched solution case, in accordance with the correlation extracted at the correlating step, and the applied result is used as the solution or intermediate solution of the problem to be solved presently.

Since a modification case instead of rules is used for modifying a solution of a solution case, it is not necessary to prepare expert knowledge in the form of rules. Accordingly, knowledge used for modifying a solution case in case-based inference can be entered easily.

Furthermore, when the execution unit of a computer system obtains a solution, the solution is displayed at the display step. A modification case entered by a user relative to the displayed solution is stored at the learning step. When the execution unit obtains thereafter a solution of a similar problem, the partial problem not settled by the solution is determined at the unsettled portion determining step. The modification case corresponding to the unsettled portion is searched at the modification case retrieving step. The searched modification case is correlated with the solution obtained by the execution unit at the correlating step. In accordance with the correlation, the modification process in the searched modification case is applied to the solution obtained by the execution unit, the result being used as the solution of the problem to be solved presently.

As described above, if a user modifies a solution made by the system, this modification is learnt as a new modification case so that similar modification can be automatically executed thereafter. Accordingly, the system is not required to change with a user need.

BRIEF DESCRIPTION OF THE DRAWINGS

FIG. 1 is a flow chart showing a solution case modifying process according to a first embodiment of the present invention;

FIG. 2 shows the structure of an inference system according to the first embodiment of the present invention;

DESCRIPTION OF THE PREFERRED EMBODIMENTS

Figure 3:
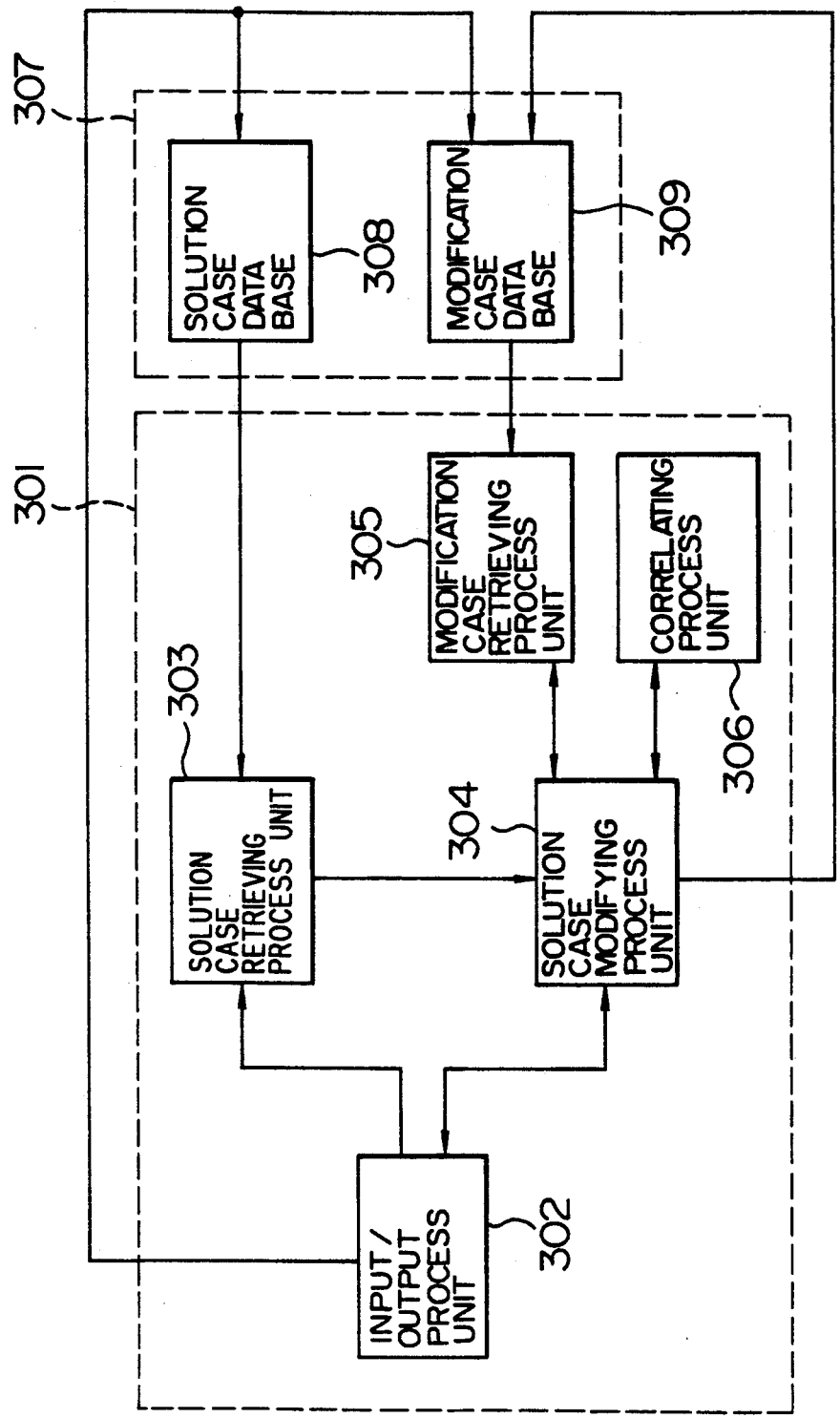
FIG. 3 is a functional block diagram of the inference system according to the first embodiment of the present invention.

Embodiments of the present invention will be described with reference to the accompanying drawings.

FIG. 2 shows the structure of an inference system according to the first embodiment of the present invention.

In FIG. 2, reference numeral 21 represents an input/output terminal unit, reference numeral 22 represents a central processing unit, and reference numeral 23 represents a storage unit.

The input/output terminal unit 21 inputs a solution case, a modification case, a problem to be presently solved, and a modification of solution, and sends them to the central processing unit 22. The input/output terminal unit 21 also receives a solution and an indication to modify the solution from the central processing unit 2, and outputs them.

The central processing unit 22 receives a solution case and a modification case from the input/output terminal unit 21, and stores them in the storage unit 23. The central processing unit 22 also operates as follows. Namely, it receives a present problem from the input/output terminal unit 21, searches a solution case having a problem similar to the present problem from the storage unit 23, searches a modification case representative of a difference between the present problem and the problem of the searched solution case from the storage unit 23, applies the modification process of the searched modification case to the solution of the searched solution case, and outputs the result as a solution of the present problem. If a modification case representative of the difference cannot be found, the solution of the searched solution case is outputted via the input/output terminal unit 21 to urge an user to modify it. If the user modifies the solution, the corresponding modification process is entered in the input/output terminal unit 21. Then, a new modification case is stored in the storage unit 23, the new modification case being constructed of a modifying portion of a solution before modification, a modification process, and a partial problem solved by the modification (i.e., difference between the present problem and the problem of a searched solution case).

The storage unit 23 receives a solution case and a modification case from the central processing unit 22, and stores them. The data stored in the storage unit 23 is transferred to the central processing unit 22 as the latter reads it.

FIG. 3 is a functional block diagram of the inference system according to the first embodiment of the present invention.

In FIG. 3, a process block generally indicated at 301 is constructed of an input/output process unit 302, a solution case retrieving process unit 303, a solution case modifying process unit 304, a modification case retrieving process unit 305, and a correlating process unit 306. A memory block generally indicated at 307 is constructed of a solution case data base 308, and a modification case data base 309.

The input/output process unit 302 inputs a solution case and a modification case, and stores them in the solution case data base 308 and the modification case data base 309, respectively. The input/output process unit 302 also inputs a present problem and sends it to the solution case retrieving process unit 303. The input/output process unit 302 also inputs a modification of a solution, and sends the modification to the solution case modifying process unit 304. The input/output process unit 302 also receives an indication to modify a solution from the solution case modifying process unit 304, and outputs it.

The solution case retrieving process unit 303 receives a present problem from the input/output process unit 302, and searches a solution case having a problem similar to the present problem from the solution case data base 308. The solution case retrieving process unit 303 also sends a present problem and a searched solution case to the solution case modifying process unit 304. A present problem and a problem of a solution case each are expressed by a combination of characteristic features such as a target item and a restriction to be obeyed. The similarity between two problems is determined from the common part within the combinations of characteristic features representative of the two problems. Such a similar case retrieving method is detailed in the above-mentioned papers on "Case-Based Reasoning Workshop (1988)", pp. 21 to 30.

The solution case modifying process unit 304 receives a present problem and a solution case from the solution case retrieving process unit 303, modifies the solution of the solution case so as to match the present problem, and outputs the modified solution via the input/output process unit 302. Such modification is carried out in the following manner.

Specifically, there is first obtained a difference between a present problem and a problem of a solution case. The difference corresponds to an unsettled portion of the present problem which is not still solved by the searched solution case and intended to be solved thereafter. Next, the modification case retrieving process unit 305 searches a modification case which solved the unsettled portion from the modification case data base 309. If a proper modification case has been found, the correlating process unit 306 correlates the searched modification case with the solution case. In accordance with such correlation, the modification process in the modification case is applied to the solution case to obtain a solution of the present problem. On the other hand, if a proper modification case has not been found, the solution of a solution case is displayed via the input/output process unit 302, and in addition an indication to urge a modification of the solution is displayed via the input/output process unit 302. If a user modifies the solution, a new modification case is stored in the modification case data base 309. The new modification case is constructed of a modifying portion of the displayed solution, a modification process, and a problem solved by the modification (i.e., difference between the present problem and the problem of a searched solution case).

The modification case retrieving process unit 305 receives a partial problem to be solved from the solution case modifying process unit 304, searches a modification case having a partial problem similar to the received partial problem from the modification case data base 309, and returns the searched modification case to the solution case modifying process unit 304. A partial problem to be solved and a partial problem of a modification case each are expressed by a combination of characteristics. A similarity between two partial problems is determined by using a similar method as used by the solution case retrieving process unit 303.

The correlating process unit 306 receives a modification case and a solution case from the solution case modifying process unit 304, determines a correlation of each part of the modification case with each part of the solution case. The result is returned to the solution case modifying process unit 304 as a correlation list between the parts of the modification case and solution case.

The solution case data base 308 stores a solution case received from the input/output process unit 302. The data stored in the solution case data base 308 is transferred to the solution case retrieving process unit 303 as the latter reads it. A solution case is constructed of a problem and its solution.

The modification case data base 309 stores a modification case received from the input/output process unit 302 or solution case modifying unit 304. The data stored in the modification case data base 309 is transferred to the modification case retrieving process unit 305 as the latter reads it. A modification case is constructed of a solution before modification, a modification process, and a partial problem solved by the modification.

Next, the operation of the solution case modifying process unit 304 will be described in detail.

FIG. 1 is a flow chart showing the solution case modifying process according to the first embodiment of the present invention.

A modification process in a modification case is expressed by a command executed at the time of modification, and a string of parameters of the command. The parameters represent particular portions of a solution of a modification case before modification, and the command is a modification command for executing a modification of the particular portions represented by the parameters. The command and a string of parameters are substituted in a variable ModProcess.

In this embodiment, there is first obtained a difference between a present problem and a problem of a solution case similar to the present problem. The obtained difference is substituted in a variable PP (step 101). More particularly, there is obtained a combination of differences between characteristic features of the present problem and the problem of a solution case similar to the present problem. The difference substituted in PP represents a partial problem of the present problem which is not still solved by the searched solution case and is intended to be solved thereafter.

Next, the modification case retrieving process unit 305 shown in FIG. 3 searches a modification case which solved a partial problem similar to that substituted in PP, from the modification case data base 309, and the searched modification case is substituted in a variable MC (step 102). If a proper modification case cannot be found, no data is substituted in MC. MCQuery is a procedure for searching a modification case having a problem similar to a partial problem, by using the partial problem as a search key. This procedure may be realized by the method described in the abovedescribed papers "Case-Based Reasoning Workshop (1988)", pp. 21 to 30.

Next, it is judged if a proper modification case has been found (step 103).

If a proper modification case has been found, the modification process advances to steps 104 to 107 to modify the solution of a solution case in accordance with the searched modification case. If not on the other hand, the modification process advances to steps 108 to 110 to make a user modify the solution of a solution case. The modification is learnt as a new modification case.

At step 104, the correlating process unit 306 correlates a modification case with a solution case, the result being substituted in a variable CL. More particularly, there is obtained a data representative of which part of a modification case is correlated with which part of a solution case, the data being represented by {(part i of modification case), (part j of solution case)}. The list of such data is substituted in CL. Such correlating process may be realized by a pattern matching method discussed in "Computer Vision" by D. H. Ballard and C. M. Brown, Prentice-Hall (1982), pp. 352 to 382.

Next, a modification process is extracted from the modification case in MC, and substituted in a variable ModProcess (step 105).

Next, in accordance with the correlation obtained at step 104, the subject portion of the modification case is replaced with the corresponding portion of the solution case to be modified (step 106). More particularly, parameters in ModProcess, i.e., the subject portion of the modification case is replaced with the corresponding portion of the solution case to be modified, and the resultant list is substituted in ModProcess (1).

Lastly, a similar modification to the modification process stated in the modification case is carried out for the corresponding portion of the solution of the solution case (step 107). Specifically, the command in the list substituted in ModProcess (1) is executed using the parameters in the list.

If the modification process branches from step 103 to step 108, the solution of a searched solution case is displayed via the input/output process unit 302.

Next, the input/output process unit 302 urges a user to modify the displayed solution (step 109).

If the user modifies the solution, the modification is stored as a new modification case in the modification case data base 309, the new modification case being constructed of a modifying portion of the solution before modification, the modification process made by the user (command and parameters used for the modification), and a partial problem solved by the modification.

Next, that a solution of a solution case can be modified by using a modification case, will be described with reference to FIGS. 4A to 6.

Figure 4A:
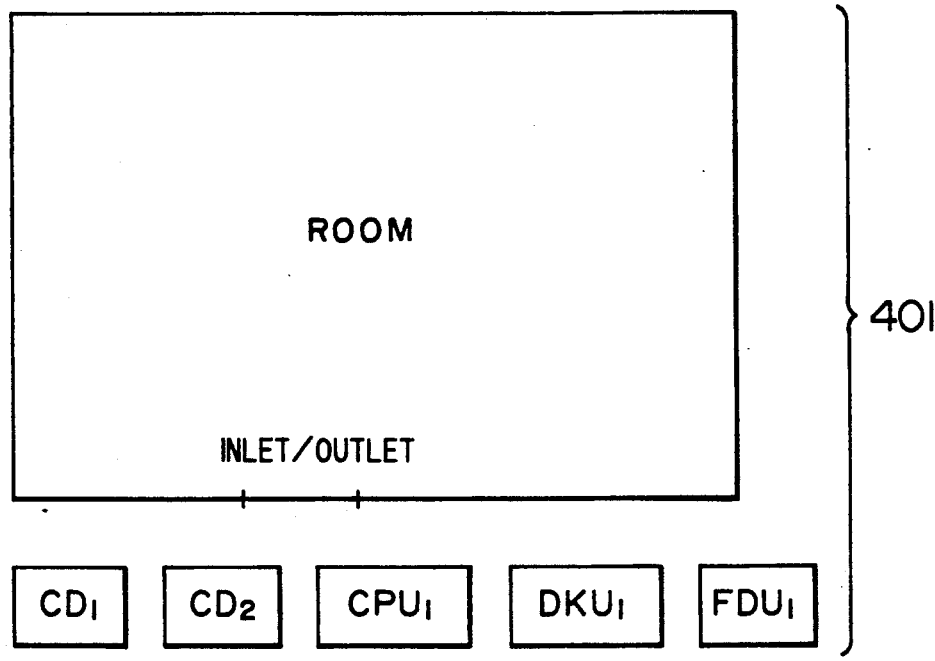
FIGS. 4A and 4B illustrate an example of a problem and a solution case thereof used in the first embodiment.
Figure 4B:
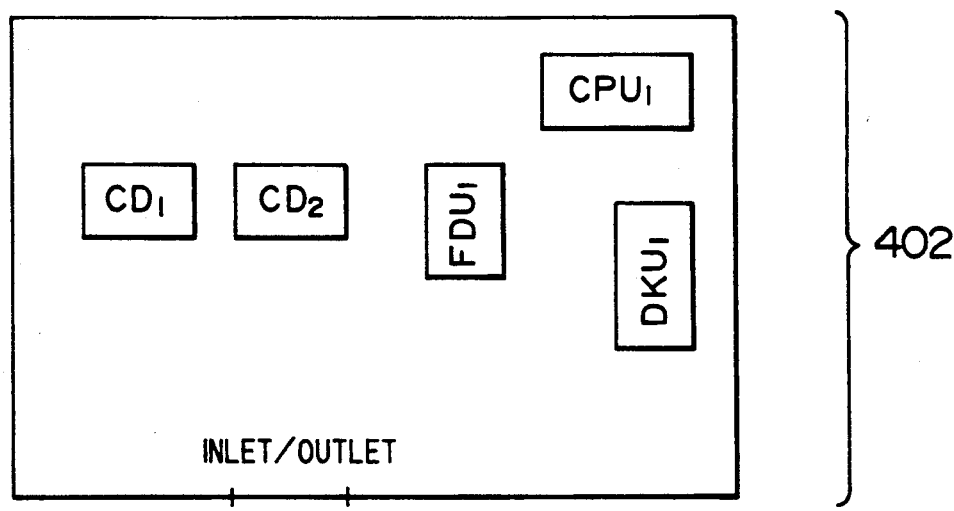
Figure 5:
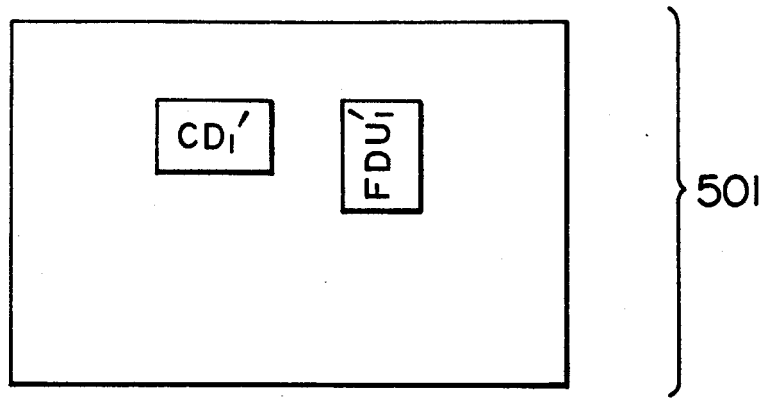
FIG. 5 illustrates an example of a modification case used in the first embodiment.
Figure 6:
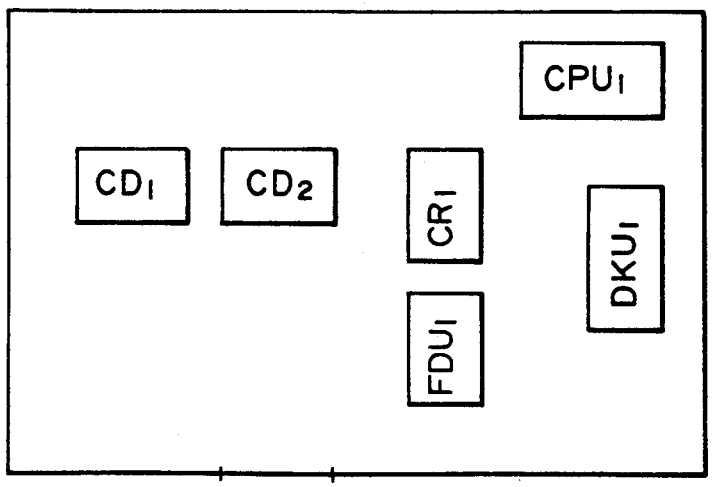
FIG. 6 illustrates an example of a solution of a problem used in the first embodiment.

FIGS. 4A and 4B illustrate an example of a problem and a solution case thereof, respectively, FIG. 5 illustrates an example of a modification case, and FIG. 6 illustrates an example of a solution of a problem, respectively according to the first embodiment of the present invention.

In this embodiment, consider a problem of laying out various apparatuses in a computer room. This problem is expressed by a combination of a data representative of a room and a data representative of one or more apparatuses to be installed within the room. The inference system inputs a combination of a room and apparatuses as a present problem, and outputs a list of positions and facing directions of apparatuses (i.e., layout in the room) as a solution. A solution case includes a combination of a room and apparatuses, and its layout. A modification case includes a layout before modification, modification process, and apparatuses newly added by the modification.

Consider as a present problem, for example, a problem how to lay out two console displays (CD), a central processing unit (CPU), a magnetic disk unit (DKU), a card reader (CR), and a floppy disk unit, within a given room.

In this case, the input/output process unit 302 first inputs data representative of the problem. Next, the solution case retrieving process unit 303 searches a solution case similar to the given problem. It is assumed that the searched solution case is such as shown in FIG. 4B. In FIG. 4A, reference numeral 401 represents a problem constructed of a combination of a room and apparatuses, and reference numeral 402 in FIG. 4B represents the solution, i.e., layout, schematically illustrated. In order to discriminate between these apparatuses, discriminators $CD_1$, $CD_2$, $CPU_1$, $DKU_1$, $CR_1$, and $FDU_1$ are assigned to the first CD, second CD, CPU, DKU, CR, and FDU, respectively. In practice, the above data is expressed by numerical values and symbols.

Next, the solution case modifying process unit 304 modifies the solution of a solution case in accordance with the procedure shown in FIG. 1.

Specifically, at step 101, a difference between the present problem and the problem of a solution case is obtained and substituted in PP. It is assumed here that the rooms have substantially the same size and shape, and that CR of the present problem is not included in the solution case shown in FIG. 4B. Accordingly, the obtained difference is $\{CR_1\}$ which is then substituted in PP. At the next step 102, there is searched a modification case which has solved a layout of $\{CR_1\}$ from the modification case data base 309, and is substituted in MC. It is assumed that the searched modification case is such as shown in FIG. 5. In FIG. 5, reference numeral 501 represents a schematic illustration of a solution before modification. $CD_1'$ and $FDU_1'$ are discriminators for CR and FDU. Reference numeral 502 represents modification processes. In this example, $FDU_1'$ is moved right as viewed from the front side of the apparatus by four units, and $CR_1'$ is placed at a position $P_1'$ in the facing direction $A_1'$. $P_1'$ and $A_1'$ represent the position and facing direction of $FDU_1'$ before modification. Accordingly, with the modification processes, FDU is moved right by four units, and CR is placed at the position where FDU was placed. Reference numeral 503 represents an apparatus laid out through the modification.

Next, at step 103, it is checked if a modification case was found. In this example, this judgement step is affirmative.

At step 104, a correlation list between the modification case and solution case is obtained and substituted in CL. In this example, $CD_1'$, $FDU_1'$, and $CR_1'$ are correlated with $CD_1$, $FDU_1$, and $CR_1$, respectively. Substituted in CL is a data $\{(CD_1',CD_2), (FDU_1', FDU_1), (CR_1', CR_1)\}$.

Next, at step 105, the modification process 502 is extracted from the modification case shown in FIG. 5, and parameters in ModProcess are replaced by the corresponding part of the solution case and substituted in ModProcess (1). In this example, substituted is the corresponding part {MOVE ($FDU_1$, right, 4), PLACE ($CR_1$, $P_1$, $A_1$)}. $P_1$ and $A_1$ represent the position and facing direction of $CR_1$.

Next, at step 107, the modification commands included in ModProcess (1) are sequentially executed. As a result, in the layout of the solution case 402 shown in FIG. 4B, FDU is moved right as viewed from the front side by four units, and CR is placed at the position where FDU was placed. The modified result as shown in FIG. 6 is thereby obtained.

The solution case modifying process unit 304 outputs the layout of FIG. 6 thus obtained, via the input/output process unit 302.

According to this embodiment, in an inference system which solves a present problem based on a past solution case, a process of modifying a solution case so as to match a present problem can be executed using a past modification case. Therefore, a difficulty of inputting modification knowledge of a solution case can be avoided, making easy to develop an inference system.

If a proper modification case is not present, the solution of a solution case is displayed so that a user can modify it. This modification case is learnt to automatically modify a similar solution case which might occur in the future. It is possible to realize an inference system which automatically extends its function wider, the more it is used.

In the embodiment, a conventional solution case modifying process unit using rules may be additionally provided so that if the solution case modifying process unit 304 cannot sufficiently modify a solution case by using a modification case, the solution case can be modified using rules.

In some cases, the modification case retrieving process unit 305 searches a plurality of modification cases at a time. Such a case can be settled easily by additionally providing a process of evaluating the solutions after modification and selecting the modification case which was evaluated as having the most excellent modification result. In this case, the modification case selected based on the evaluation may be made to have a higher priority order, so that a modification case having a higher priority order can be preferentially used. Furthermore, information of such priority order may be included in a modification case, so that at a later modification case retrieval, the modification case having a higher priority order can be preferentially searched.

An inference system of the second embodiment is constructed of an input/output terminal unit, a central processing unit, and a storage unit, similar to the first embodiment.

Different from the first embodiment, a modification case is composed of a solution before modification, a solution after the modification, and a partial problem solved by the modification. In other words, a modification case includes the solution after the modification in place of the modification process of the first embodiment.

The central processing unit and storage unit have the same function and structure as those of the first embodiment. However, since the structure of a modification case is different, the solution case modifying process unit 304 and modification case data base 309 shown in FIG. 3 have different contents.

More particularly, the solution case modifying process unit 304 receives a present problem and a solution case from the solution case retrieving process unit 303, modifies the solution of the solution case so as to match the present problem, and outputs the modified solution via the input/output process unit 302. Such modification is carried out in the following manner.

There is first obtained a difference between a present problem and a problem of a solution case (step 101). Next, the modification case retrieving process unit 305 searches a modification case which solved the difference, from the modification case data base 309. If a proper modification case has been found, the correlating process unit 306 correlates the searched modification case with the solution case. In accordance with such correlation, the solution of a solution case is modified so as to match the modified solution of the modification case, the modified result being used as the solution of the present problem. On the other hand, if a proper modification case has not been found, the solution of a solution case is displayed via the input/output process unit 302, and in addition an indication to urge a modification of the solution is displayed. If a user modifies the solution, a new modification case is stored in the modification case data base 309. The new modification case is constructed of a modifying portion of the displayed solution, a modified portion of the displayed solution, and a problem solved by the modification.

The modification case data base 309 stores a modification case received from the input/output process unit 302 or solution case modifying unit 304. The data stored in the modification case data base 309 is transferred to the modification case retrieving process unit 305 as the latter reads it. A modification case is constructed of a solution before modification, a solution after the modification, and a partial problem solved by the modification.

Next, the operation of the solution case modifying process unit 304 will be described in detail with reference to FIG. 7.

Figure 7:
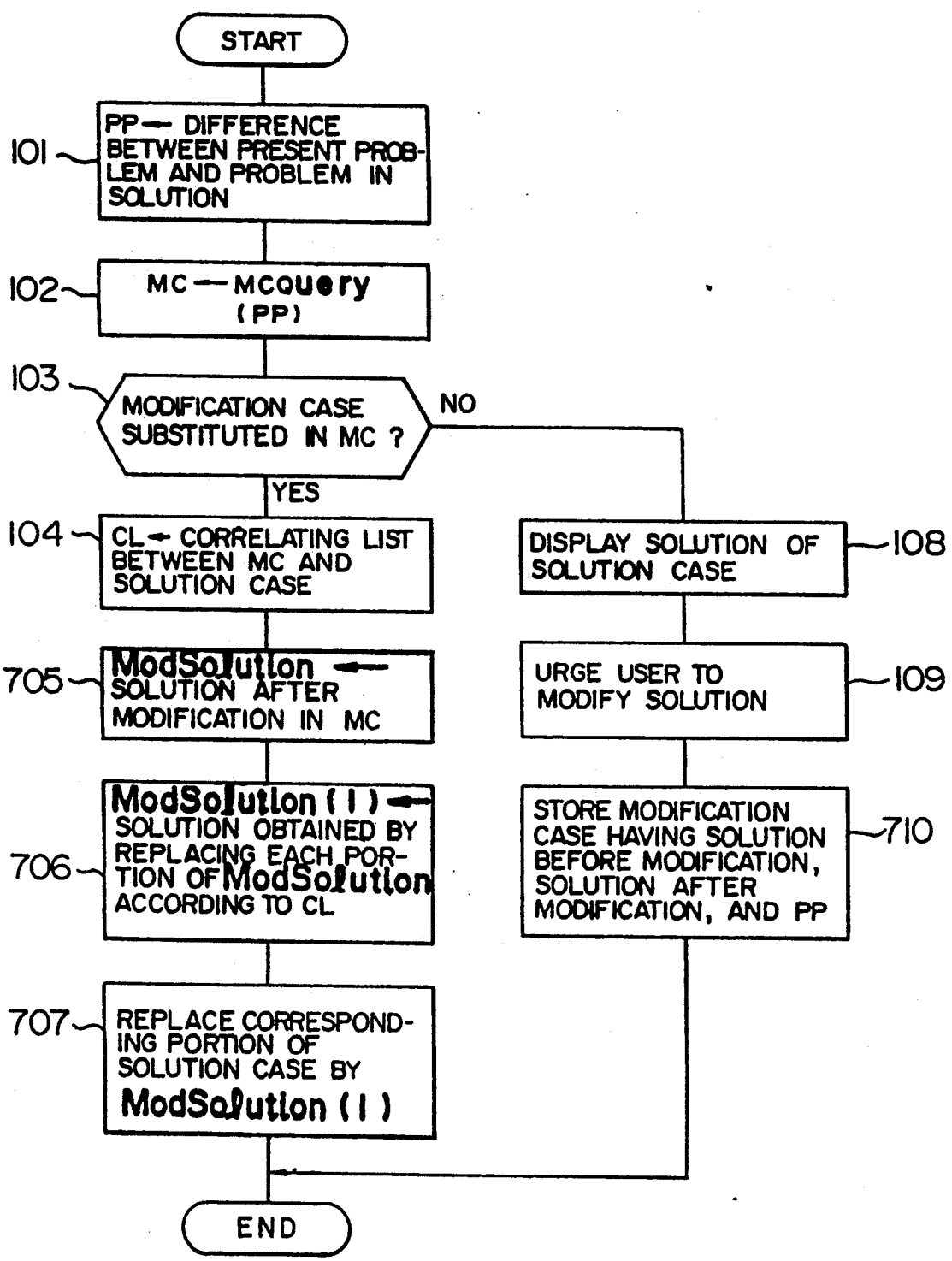
FIG. 7 is a flow chart showing the solution case modifying process according to a second embodiment of the present invention.

FIG. 7 is a flow chart showing the solution case modifying process according to the second embodiment of the present invention.

Steps 101 to 104, and steps 108 and 109 are the same as the first embodiment (FIG. 1).

After steps 103 and 104, MC, i.e., the modified solution of a modification case, is substituted in ModSolution (step 705).

Next, in accordance with a correlation list CL representative of a correlation between a portion of the modification case and a portion of the solution case, each portion of the modified solution of the modification case substituted in ModSolution is replaced by a corresponding portion of the solution case, the result being substituted in ModSolution (1) (step 706). With this process, the same modification as in the modification case is applied to the modifying portion of the solution case, and the modified result is substituted in ModSolution (1).

The modifying portion of the solution case is replaced by ModSolution (1). The result of this process is a solution case modified by the same modification as in the modification case.

If a proper modification case cannot be found at step 103, the modification process advances to steps 108 and 109 whereat a new modification case is stored in the modification case data base 309 shown in FIG. 3 (step 710), the new modification case data being constructed of a modifying portion of a displayed solution, a modified portion of the displayed solution, and a partial problem obtained by the modification.

According to this embodiment, in an inference system which solves a present problem based on a past solution case, a process of modifying a solution case so as to match a present problem can be executed using a past modification case. Therefore, a difficulty of inputting modification knowledge for a solution case can be avoided, making easy to develop an inference system.

If a proper modification case is not present, the solution of a solution case is displayed so that a user can modify it. This modification case is learnt to automatically modify a similar solution case which might occur in the future. It is possible to realize an inference system which automatically extends its function wider, the more it is used.

Figure 8:
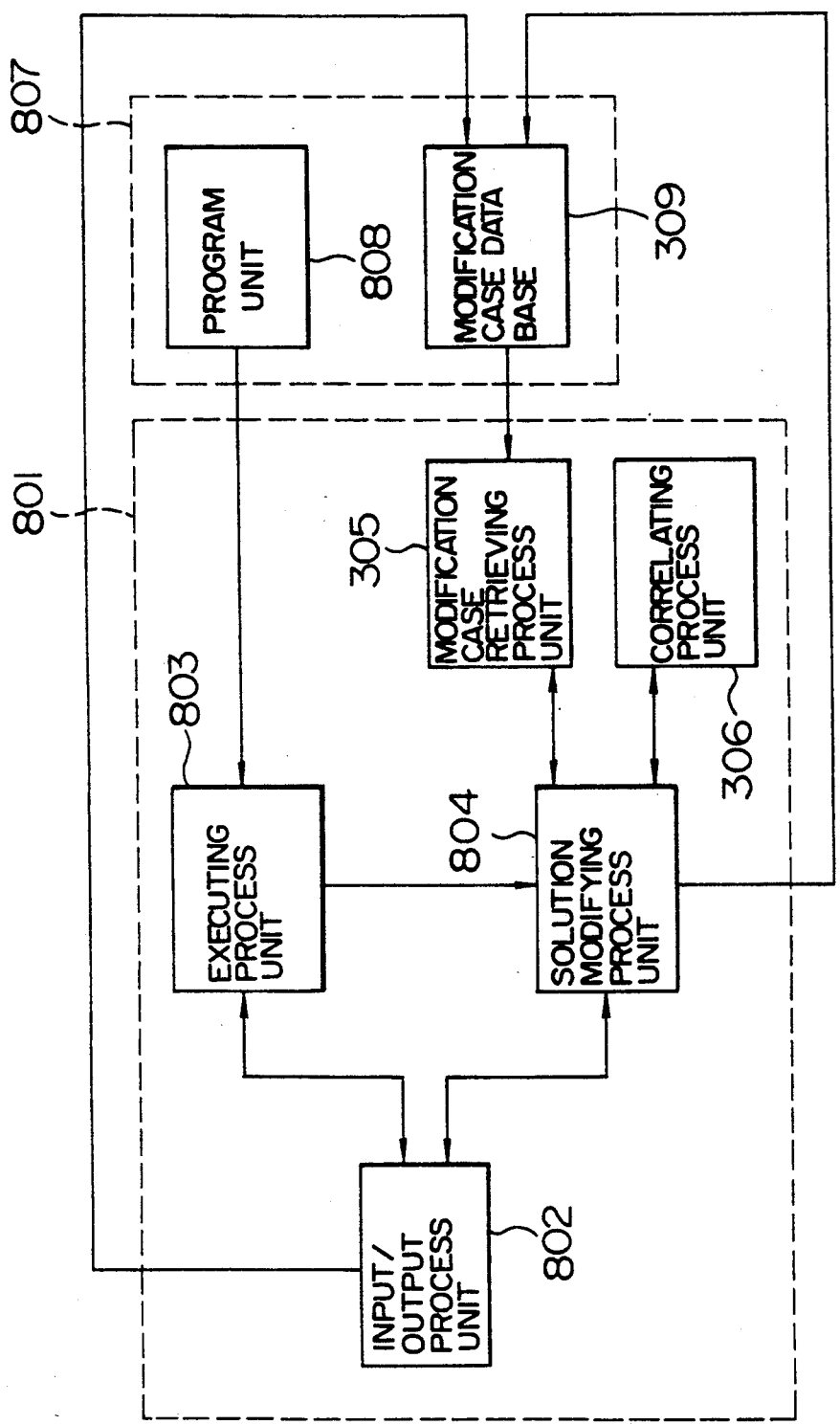
FIG. 8 is a functional block diagram of a computer system according to a third embodiment of the present invention.
Figure 9:
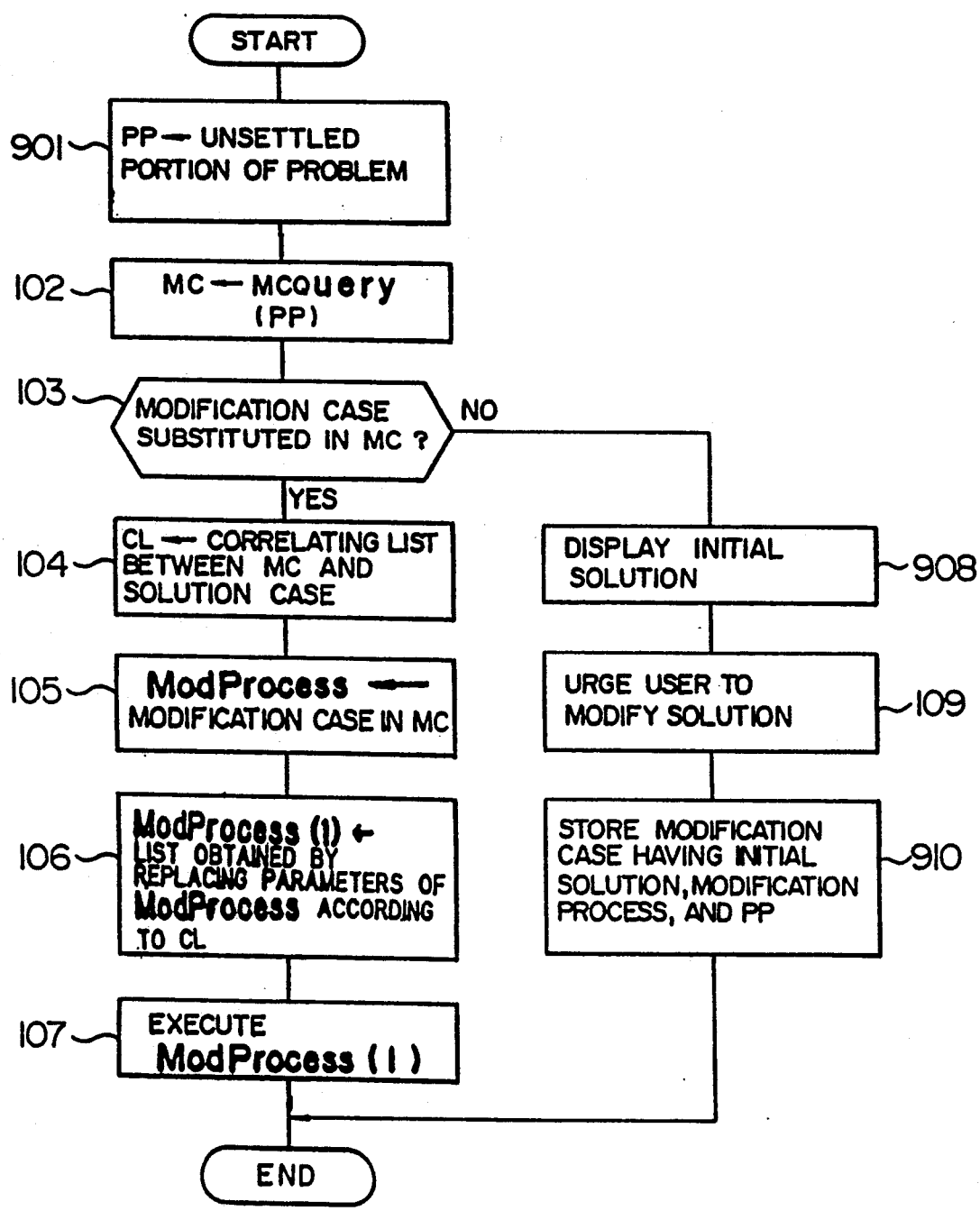
FIG. 9 is a flow chart showing the solution case modifying process according to the third embodiment of the present invention.

FIG. 8 is a functional block diagram showing a computer system according to the third embodiment of the present invention, and FIG. 9 is a flow chart showing a solution modifying process according to the third embodiment of the present invention.

The computer system of this embodiment is constructed of an input/output terminal unit, a central processing unit, and a storage unit, similar to the first embodiment.

In FIG. 8, a process block generally indicated at 801 is constructed of an input/output process unit 802, an interpretation executing process unit 803, a solution modifying process unit 804, a modification case retrieving process unit 305, and a correlating process unit 306. A memory block generally indicated at 807 is constructed of a program unit 808, and a modification case data base 309. The modification case retrieving process unit 305, correlating process unit 306, and modification case data base 309 are substantially the same as described with the first embodiment (FIG. 3).

The input/output process unit 802 inputs a modification case and stores it in the modification case data base 309. The input/output process unit 802 also inputs a present problem and sends it to the interpretation executing process unit 803. The input/output process unit 802 also inputs a modification of a solution, and sends the modification to the solution modifying process unit 804. The input/output process unit 302 also receives an indication to modify a solution from the solution modifying process unit 804, and outputs it.

The interpretation executing process unit 803 receives a present problem from the input/output process unit 302, and obtains an initial solution of the problem by using a program in the program unit 808 or knowledge. If the problem is solved sufficiently, the initial solution is considered as the final solution which is then outputted via the input/output terminal unit 802. If the problem is not solved sufficiently, the unsettled portion of the problem and the initial solution are transferred to the solution modifying process unit 804.

The solution modifying process unit 804 receives the unsettled portion of the problem and the initial solution from the interpretation executing process unit 803, modifies the initial solution so as to match the unsettled portion, and outputs the modified solution via the input/output terminal unit 802. The modification procedure is given in FIG. 9.

As shown in FIG. 9, the unsettled portion of a present problem is substituted in a variable PP (step 901). The modification case retrieving process unit 305 searches a modification case which solved the unsettled portion, from the modification case data base 309 (steps 102 and 103).

If a proper modification case has been found, the correlating process unit 306 correlates the searched modification case with the initial solution (step 904). In accordance with such correlation, the modification process in the searched modification case is applied to the initial solution to obtain the final solution (steps 105 to 107).

If a proper modification case has not been found, the initial solution is displayed via the input/output terminal unit 802 (step 908), and in addition an indication to modify the initial solution is displayed via the input/output terminal unit 802 (step 109). If a user modifies the initial solution, a new modification case is stored in the modification case data base 309 (step 910), the new modification case being constructed of a modifying portion of a displayed solution, a modification process, and a problem solved by the modification (i.e., a problem corresponding to the unsettled portion).

A newly learned modification case is used to automatically modify the initial solution of a similar solution which might be inputted in the future.

The solution modifying process unit 804 of this embodiment can be realized by a similar process executed by the solution case retrieving process unit 304 of the first embodiment. Namely, in the solution case modifying process unit, the difference between a present problem and a problem of a solution case is replaced by the unsettled portion, and the solution of the solution case is replaced by the initial solution.

According to this embodiment, an initial solution of a given problem is obtained using a program or knowledge, and modified by using a modification case. If a proper modification case is not present, the initial solution is displayed so that a user can modify it. A modification case given by the user is learnt so that the initial solution of a similar problem inputted after learning can be automatically modified using the learnt modification case.

Figure 10:
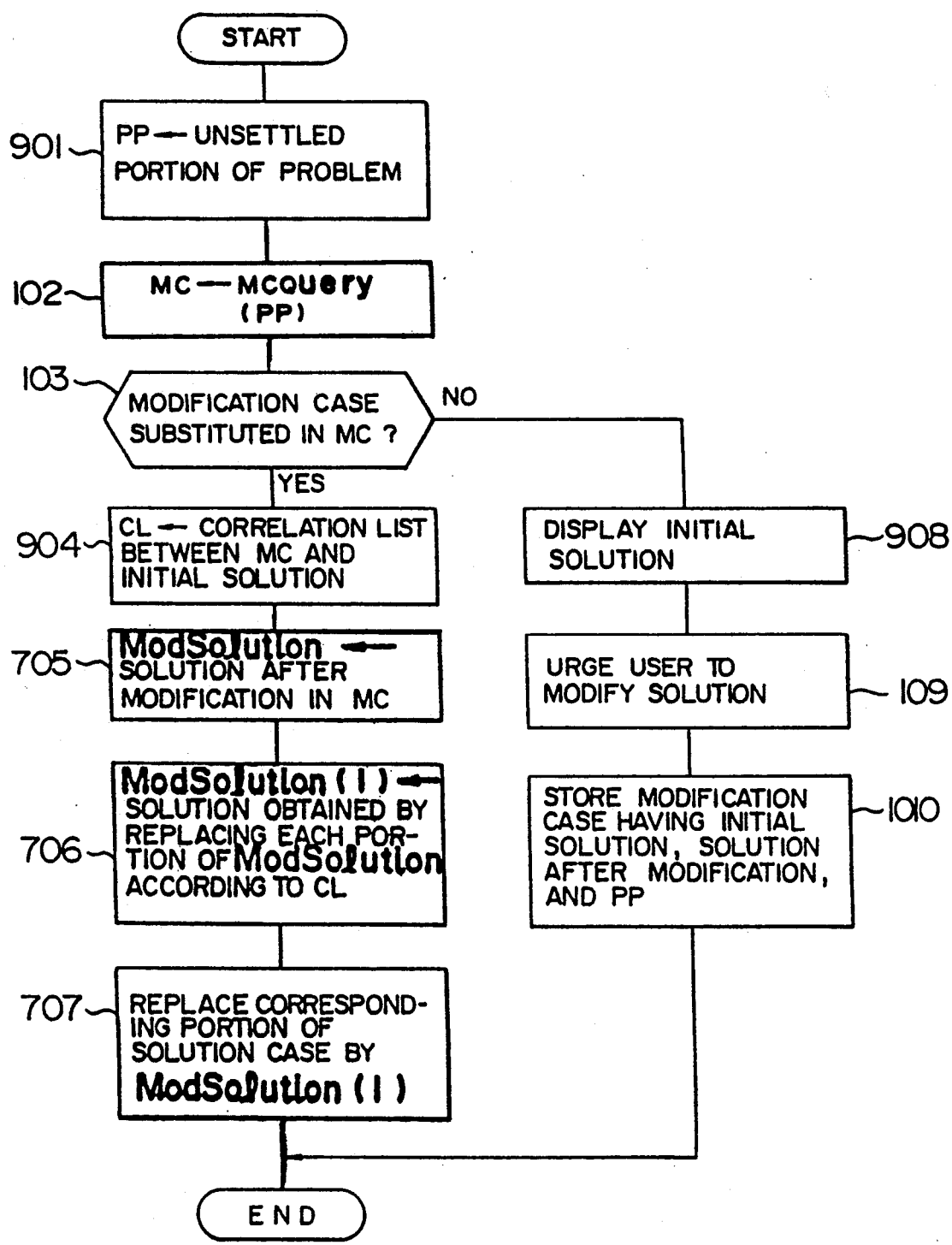
FIG. 10 is a flow chart showing the solution modifying process according to a fourth embodiment of the present invention.

FIG. 10 is a flow chart illustrating a solution modifying process according to the fourth embodiment of the present invention.

The computer system according to this embodiment is constructed of an input/output terminal unit, a central processing unit, and a storage unit, similar to the first embodiment. The function and structure of this embodiment are substantially the same as the third embodiment. A different point from the third embodiment is that the contents of a modification case include an initial solution, a solution after modification, and an unsettled portion of the problem. The solution after modification is used in place of the modification process.

The unsettled portion of a present problem is substituted in a variable PP (step 901). A modification case which solved the unsettled portion is searched (steps 102 and 103). After correlating the searched modification case with the initial solution (step 904), the processes at steps 705 to 707 are executed.

Similar to the steps 705 to 707 shown in FIG. 7, the modified solution of a modification case is substituted in ModSolution. In accordance with a correlation list CL representative of a correlation between a modification case a solution case, each portion of the modified solution of the modification case is replaced by a corresponding portion of the solution case, to substitute the modified result into ModSolution (1). The modifying portion of the solution case is replaced by ModSolution (1). The result of this process is a solution case modified by the same modification as in the modification case.

If a proper modification case cannot be found at step 103, the initial solution and an indication to modify it are displayed (steps 908 and 109), and a new modification case is stored in the modification case data base 309 (step 1010), the new modification case data being constructed of an initial solution, a solution after modification, and an unsettled portion.

As seen from the above embodiments, in a computer system for solving a problem using a program or knowledge, if a solution given by the system is modified by a user, this modification case is learnt to automatically modify the initial solution of a similar problem entered thereafter. Accordingly, it is not necessary to change the system with a user need, dispensing with a labor otherwise required for the system change and preventing generation of possible errors at the system change.

According to the present invention, in an inference system for solving a problem by modifying a case similar to the given problem, knowledge used for modifying a similar case can be entered easily, making it easy to develop the inference system. If a similar case is modified by a user, such a modification case is learnt to automatically execute similar modification thereafter. It is therefore possible to provide an inference system which automatically extends its function wider the more it is used.

Furthermore, if a user modifies a solution given by a computer system, such a modification case is learnt to automatically execute similar modification thereafter. Therefore, it is not necessary to change the system with a user need, dispensing with a labor otherwise required for the system change and preventing generation of possible errors at the system change.

We claim:

1. An inference processing method for a computer system having a storage unit for storing at least one of a program and knowledge used for solving a problem, an input/output unit for inputting a problem to be presently solved, and an execution unit for obtaining a proposed solution of the problem to be presently solved and a partial problem of the problem, by using at least one of the program and knowledge in the storage unit, said inference processing method comprising the steps of:

storing at least one modification case generated upon modifications of prior solutions, into said storage unit, said modification case including a solution before modification, a modification process for obtaining the solution, and a partial problem solved by the modification process;

inputting said problem to be solved, from said input/output unit;

obtaining by said execution unit a proposed solution of one of said inputted problem to be solved and a partial problem of said inputted problem, by using said program and knowledge in said storage unit;

identifying a portion of said problem to be solved and said partial problem, unable to be solved by said proposed solution obtained by said execution unit;

searching for a modification case containing a partial problem similar to said unsolved portion, from at least one modification case generated upon modification of the prior solutions, and stored in said storage unit;

correlating said searched for modification case with said proposed solution obtained by said execution unit; and automatically modifying said proposed solution obtained by said execution unit in accordance with said correlation and using said modified result as one of an overall solution and an intermediate solution of said problem to be solved, and wherein, said modifying step includes applying said modification process in said modification case to one of said proposed solution obtained by said execution unit and a solution in said solution case searched by a solution case retrieving unit, in accordance with said correlation, and using the applied result as one of the overall solution and the intermediate solution of said problem to be solved.

2. An inference processing method according to claim 1, wherein said automatically modifying step further includes modifying one of said proposed solution obtained by said execution unit and said solution in solution case searched by said solution case retrieving unit so as to match said solution after the modification in said modification case, in accordance with said correlation, and using the modified result as one of the overall solution and the intermediate solution of said problem to be solved.

3. An inference processing method according to claim 2, further comprising the steps of:

displaying by said input/output unit one of said proposed solution obtained by said execution unit and said solution in said solution case searched by said solution case retrieving unit; and when the displayed solution is modified by a user, storing a modification case including a modifying portion of the solution before modification, a modified portion of the solution after the modification, and a partial problem solved by the modification.

4. An inference processing method according to claim 1, further comprising the steps of:

displaying by said input/output unit one of said proposed solution obtained by said execution unit and said solution in said solution case searched by said solution case retrieving unit; and when the displayed solution is externally modified, storing a modification case including a modifying portion of the solution before modification, a modification process, and a partial problem solved by the modification process.

5. An inference processing method according to claim 1, wherein in searching for said modification case, a similarity between two partial problems is judged based on common subject of two sets of characteristic features which represent each of the partial problems.

6. An inference processing method according to claim 1, further comprising a step of modifying again one of said overall solution and said intermediate solution obtained in accordance with said modification case so as to apply said modified result to one of said problem to be solved presently and said partial problem.

7. An inference processing method according to claim 1, further comprising a step of when searching for said modification case results in a plurality of modification cases, evaluating solutions obtained from said plurality of modification cases and using an optimum modification case.

8. An inference processing method according to claim 7, wherein said modification case includes priority order information, when the optimum modification case is selected by evaluating said solutions, the priority order of said optimum modification case is made high and a modification case is selected in accordance with said priority order.

9. An inference processing method according to claim 7, wherein when the optimum modification case is selected by evaluating said solutions, a priority order of said optimum modification case is made high and a modification case having a higher priority order is preferentially used.

10. An inference processing method for an inference system having a solution case data base for storing a solution case including a problem and at least one of a proposed solution of the problem and a way to solve the problem, an input/output unit for inputting a problem to be solved, a solution case retrieving unit for searching for a solution case having a problem similar to the problem to be solved and a partial problem of the problem, from the solution case data base, and a solution case modifying unit for, respectively, modifying one of the proposed solution and the way to solve the searched for solution case, to obtain one of an overall solution and an intermediate solution of the problem to be solved, said inference processing method comprising the steps of:

storing at least one modification case generated upon modification of prior solutions in a storage unit, said modification case including a solution before modification, a modification process for obtaining the solution, and a partial problem solved by the modification process;

inputting a problem to be solved, from said input/output unit;

searching by said solution case retrieving unit a solution case having a problem similar to one of the inputted problem to be solved and a partial problem of the inputted problem, from said solution case data base;

when said solution case modifying unit modifies the solution of said searched solution case, searching for a modification case having a partial problem similar to a portion corresponding to a difference between one of the problem to be solved and the partial problem, and the problem contained in said searched solution case, from said at least one modification case in said storage unit, and correlating said searched modification case with said searched solution case; and automatically modifying said proposed solution obtained by said searched solution case in accordance with said correlation and using said modified result as one of an overall solution and an intermediate solution of said problem to be solved, and wherein said modifying step includes applying said modification process in said modification case to one of said proposed solution obtained by an execution unit and a solution in said solution case searched by said solution case retrieving unit, in accordance with said correlation, and using the applied result as one of the overall solution and the intermediate solution of said problem to be solved.

11. An inference processing method according to claim 10, wherein said automatically modifying step further includes modifying one of said proposed solution obtained by said execution unit and said solution in said solution case searched by said solution case retrieving unit so as to match said solution after the modification in said modification case, in accordance with said correlation, and using the modified result as one of the overall solution and the intermediate solution of said problem to be solved presently.

12. An inference processing method according to claim 11, further comprising the steps of:

displaying by said input/output unit one of said proposed solution obtained by said execution unit and said solution in said solution case searched by said solution case retrieving; and when the displayed solution is modified by a user, storing a modification case including a modifying portion of the solution before modification, a modified portion of the solution after the modification, and a partial problem solved by the modification.

13. An inference processing method according to claim 10, further comprising the steps of:

displaying by said input/output unit one of said proposed solution obtained by said execution unit and said solution in said solution case searched by said solution case retrieving unit; and when the displayed solution is externally modified, storing a modification case including a modifying portion of the solution before modification, a modification process, and a partial problem solved by the modification process.

14. An inference processing method according to claim 10, wherein in searching for said modification case, a similarity between two partial problems is judged based on common subject of two sets of characteristic features which represent each of the partial problems.

15. An inference processing method according to claim 10, further comprising the step of modifying again one of said overall solution and said intermediate solution obtained in accordance with said modification case so as to apply said modified result to one of said problem to be solved presently and said partial problem.

16. An inference processing method according to claim 10, further comprising a step of, when searching for said modification case results in a plurality of modification cases, evaluating solutions obtained from said plurality of modification cases and using an optimum modification case.

17. An inference processing method according to claim 16, wherein said modification case includes priority order information, when the optimum modification case is selected by evaluating said solutions, the priority order of said optimum modification case is made high and a modification case is selected in accordance with said priority order.

18. An inference processing method according to claim 16, wherein when the optimum modification case is selected by evaluating said solutions, a priority order of said optimum modification case is made high and a modification case having a higher priority order is preferentially used.

* * * * *

UNITED STATES PATENT AND TRADEMARK OFFICE
CERTIFICATE OF CORRECTION

PATENT NO. : 5,243,689
DATED : September 7, 1993
INVENTOR(S) : Hiroshi Yoshiura, et al.

It is certified that error appears in the above-identified patent and that said Letters Patent is hereby corrected as shown below:

Claim 2, column 14, line 6, after "in" insert --said--.

Claim 12, column 16, line 8, after "retrieving" insert --unit--.

Signed and Sealed this

Twelfth Day of April, 1994

Attest:

BRUCE LEHMAN

*Attesting Officer*     *Commissioner of Patents and Trademarks*